United States Patent

Marsi

[15] 3,638,957
[45] Feb. 1, 1972

[54] MECHANICAL SEAL WITH LUBRICATING MEANS
[72] Inventor: Joseph A. Marsi, Baldwin Park, Calif.
[73] Assignee: Borg-Warner Corporation, Chicago, Ill.
[22] Filed: Mar. 19, 1970
[21] Appl. No.: 20,954

[52] U.S. Cl............................................................277/96
[51] Int. Cl...................................................F16j 15/34
[58] Field of Search.........................................277/81, 94, 96

[56] References Cited

UNITED STATES PATENTS 2,247,505  7/1941  Kohler....................................277/96

FOREIGN PATENTS OR APPLICATIONS 549,571  4/1932  Germany..................................277/96
735,250  8/1955  Great Britain...........................277/96

Primary Examiner—Robert I. Smith
Attorney—Donald W. Banner, William S. McCurry and John W. Butcher

[57] ABSTRACT

A mechanical seal assembly of the type having a stationary sealing ring and a rotary sealing ring biased one toward the other to form an annular sealing interface between the relatively rotatable radial faces of the rings, one of the rings including a reservoir in its annular surface consisting of a lubricating groove or grooves providing groove portions oblique to the path of rotation of the rotary sealing ring, and having sealing face surfaces between the groove or grooves and the inner and outer peripheries of the annular interface.

9 Claims, 4 Drawing Figures

PATENTED FEB 1 1972
3,638,957
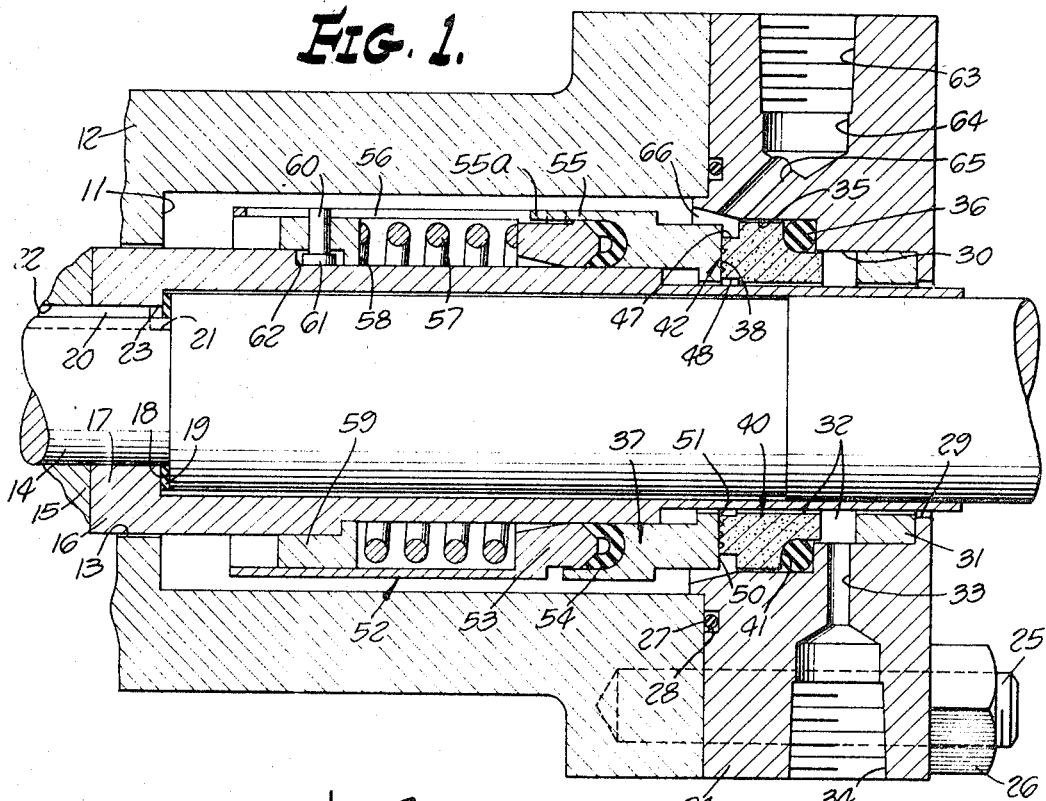
FIG. 1.
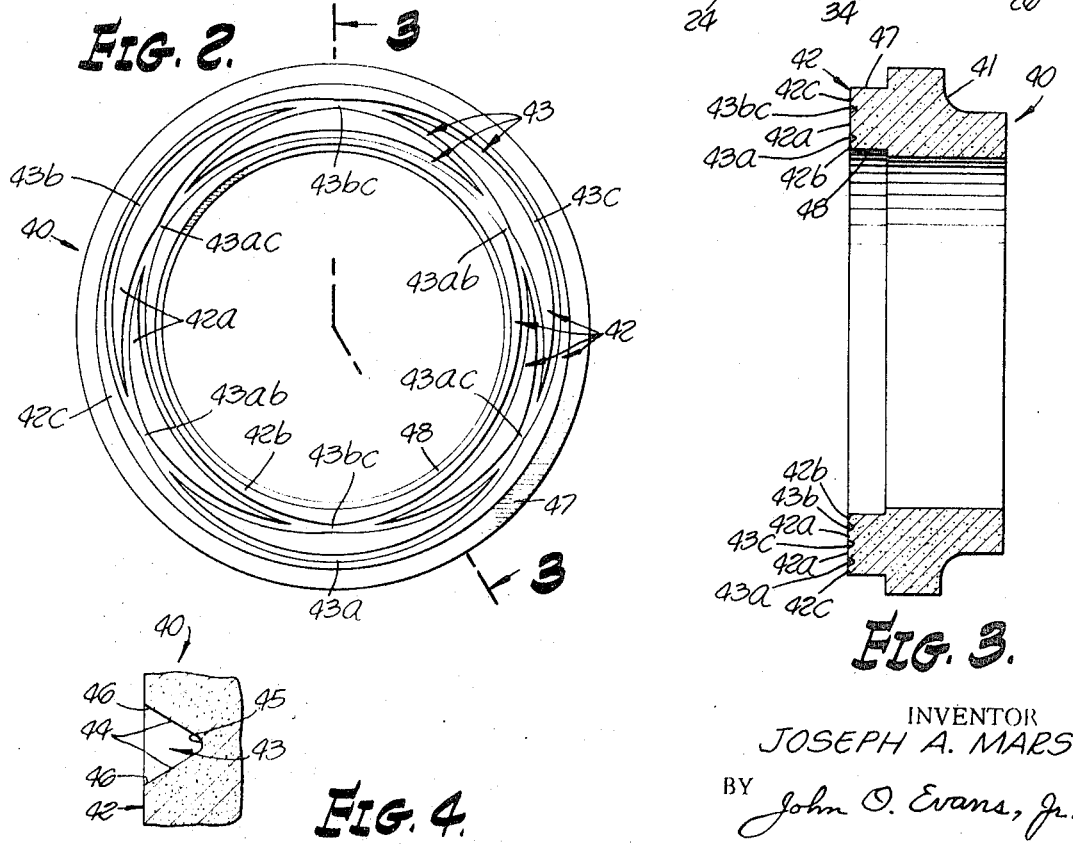
FIG. 2.
FIG. 3.
FIG. 4.
INVENTOR
JOSEPH A. MARSI
BY John O. Evans, Jr.
ATTORNEY

MECHANICAL SEAL WITH LUBRICATING MEANS

BACKGROUND OF THE INVENTION

This invention relates to mechanical seals of the type used for sealing between a housing, such as a pump housing, and a rotating shaft, such as the pump impeller shaft, such seals employing relatively rotating sealing elements which have contacting radial annular faces lapped to extremely flat finishes in order to provide a fluid seal at the interface of the sealing surfaces. One of the sealing elements or sealing rings is nonrotating and is mounted in the housing; the complementary ring is mounted on the shaft or a shaft sleeve for rotation therewith. One of the rings is biased, as by a spring or springs, for axial movement toward the other sealing ring for contact of the complementary faces to form the annular sealing interface. One of the peripheries of the interface being in contact with fluid under pressure in the pump housing and the other periphery being at a lower or atmospheric pressure, there is thus a pressure gradient therebetween so that a small amount in the form of a very thin film of the fluid may flow across the interface, tending to cool and lubricate the faces, resulting in reduced heat buildup and wear of the sealing surfaces. The thin film flow across the interface may be inadequate to cool and lubricate the surfaces when pumping high temperature fluids, particularly at very high speeds. Alleviation of this problem has been accomplished in the past by pumping a cooling liquid from an auxiliary source through a conduit to a groove or grooves opening into the stationary sealing ring.

SUMMARY OF THE INVENTION

It is one of the objects of this invention to provide a mechanical seal, one of the sealing rings of which provides a reservoir in the form of a groove or grooves opening into the interface, and so oriented as to provide cooling and lubricating fluid to the sealing interface on relative rotation of the sealing ring faces.

Another object of the invention is to provide a mechanical seal on the face of one of the sealing rings of which is provided groove means which presents an edge at an angle oblique to the path of rotation of the rotary sealing ring and with sealing surface or land portions both radially inward and outward from the groove.

A further object of this invention is to provide a mechanical seal, the surface of one of the relatively rotating sealing faces of which provides a plurality of annular eccentric grooves, between the intersections of which are provided arcuate groove portions defining between the latter sealing face portions or lands uniformly annularly spaced, and generally annular sealing face portions also being provided between the grooves and the peripheries of the interface so as to have a substantially uniform distribution of lubrication and land surface about the annular sealing interface.

An additional object of the invention is to provide such a mechanical seal, any arc of the groove being eccentric to the relative rotation at the interface and oblique to the path of rotation about the interface.

The invention is embodied in a mechanical seal for sealing a rotatable shaft to a wall that separates fluids under different pressures, the wall having an aperture through which the shaft extends, the seal comprising a stationary sealing ring sealingly mounted on the wall encircling the shaft and a rotary sealing ring sealingly mounted on and encircling the shaft, both rings having generally radial annular sealing surfaces, the latter being mated by the disposition of the rings to provide an annular sealing interface and for relative rotation between them, the interface having radially outer and inner peripheries exposed to fluids on opposite sides of the wall; one of the rings is movable axially with respect to the other, with resilient means for restraining it against the axial movement; one of the rings has groove means opening into the annular sealing interface, the groove means being spaced inward from the outer and outward from the inner periphery, and having portions oblique to the path of rotation of the rotary sealing ring.

BRIEF DESCRIPTION OF THE DRAWINGS

FIG. 1 is a longitudinal cross-sectional view through a pump housing, showing a mechanical seal and sealing ring according to the invention;

FIG. 2 is a plan view, on an enlarged scale, of the stationary sealing ring according to the invention.

FIG. 3 is an axial sectional view, taken on the line 3—3 of FIG. 2, and looking in the direction of the arrows; and FIG. 4 is a fragmentary sectional view, on a further enlarged scale, showing the groove detail of the sealing ring.

DESCRIPTION OF THE PREFERRED EMBODIMENTS

Referring to FIG. 1, a portion of a pump housing and its stuffing box are shown, the stuffing box 11 being formed in the housing 12 and being in communication through a shaft opening 13 in the housing 12 with the impeller chamber (not shown) of the pump. A rotary shaft 14 extends through the opening 13 and the stuffing box 11. The shaft 14 drives the pump impeller 15, a portion of which is shown, and is driven by a motor (not shown).

To the shaft 14 is fitted concentrically thereon a shaft sleeve 16, the latter having an inturned flange 17, and the shaft having a shoulder 18; between the flange 17 and shoulder 18 is a gasket 19 to prevent leakage between the shaft sleeve 16 and the rotary shaft 14, the flange 17 and the gasket 19 being affixed tightly between the impeller 15 and the shoulder 18.

The shaft 14, impeller 15, and sleeve 16 are adapted to rotate as a unit by means of a drive key 20 which fits into a shaft keyway 21, impeller keyway 22, and sleeve keyway 23.

The stuffing box 11 is closed at its outer end by a flange 24, the latter being fastened to the housing 12 by means of studs 25 and nuts 26, one of each of which is shown. An O-ring 27 in a groove 28 provides a seal between the housing 12 and flange 24. The flange 24 has an opening 29 through which the shaft 14 extends, and an enlarged annular groove 30 into which a bushing 31 is fitted so as to surround the shaft sleeve 16 with a close fit, forming the outer end barrier for an annular drainage chamber 32, which has a drain outlet passage 33 with a threaded opening 34, to which an outlet conduit (not shown) may be connected.

In an annular recess 35 in the flange 24 is seated a stationary or nonrotary sealing ring 40, an O-ring seat gasket 36 fitting between an outer annular recess 41 in the ring 40 and the recess 35 of the flange 24, preventing leakage from the stuffing box 11 to the annular drainage chamber 32, and serving to retain the ring 40 from movement or rotation in the recess 35 by frictional engagement therebetween. The face 42 of the stationary sealing ring 40 is lapped to provide an extremely flat radial annular sealing surface.

Encircling the shaft sleeve 16 for axially slidable movement thereon is a rotary sealing ring 37, having a face 38 lapped to provide an extremely flat radial annular sealing surface, the two lapped faces 38 and 42 being adaptable for engagement to provide a seal at their interface 38, 42 between the stuffing box cavity 11 and the annular drainage chamber 32, there being a pressure gradient from the outer periphery 50 of the interface in communication with the higher pressure fluid in the cavity 11 to the inner periphery 51 of the interface in communication with the lower or atmospheric pressure in the chamber 32.

Also, encircling the shaft sleeve 16 for axial slidable movement thereon is a spring holder 52 with an annular expander or backup portion 53 adapted to expand a U-cup seal 54 which bears against the inner or back portion of the rotary ring 37 and provides a seal between a rearwardly extended outer sleeve portion 55 of the sealing ring 37 and the shaft sleeve 16 so as to prevent leakage between the ring 37 and the sleeve 16 from the stuffing box cavity 11 to the chamber 32. The spring holder 52 is provided with a number of axially extended slots 56, into one of which is axially slidable a lug or tang extension 55a of the sleeve portion 55 of the sealing ring 37 so that the sealing ring 37 and spring holder 52 are keyed together for unitary rotation but are free for relative axial movement.

A compression spring 57 also encircles the shaft sleeve 16, between the latter and the spring holder 52. The spring 57 engages at one end with the back of the expander 53 and is backed up at its other end by an annular flange 58 on a seal driving insert 59 which is interposed between the spring holder 52 and the shaft sleeve 16. A drive pin 60 is carried by the insert 59, and has a head 61 disposed in a notch 62 in the outer portion of the shaft sleeve 16, with the stem of the drive pin 60 projecting into one of the slots 56 of the spring holder 52. Thus, the shaft sleeve 16 is connected to the spring holder 52, which is in turn connected to the rotary sealing ring 37, so that these elements are all rotatable as a unit but axially shiftable relative to each other.

For optimum sealing, friction, and wear qualities, the lapped surfaces 38 and 42, providing the sealing interface 38, 42 of the respective sealing rings 37 and 40 should be of dissimilar materials. A common practice is to make the rotating ring 37 of tungsten carbide and the stationary ring 40 of carbon. The surface area of the interface is determined by providing in the sealing ring 40 an outer peripheral relief 47 and an inner peripheral relief 48, which thus define, respectively, the outer periphery 50 and the inner periphery 51 of the sealing interface of the two lapped faces 38 and 42.

For enhanced cooling of the mechanical seal, and to preclude contamination of the seal area when deleterious fluids are being pumped, cooling liquid under pressure may be introduced through an inlet conduit (not shown) which is connected to the threaded inlet opening 63, so that the coolant may pass through the radial bore 64 and the passage 65 into the annular cavity portion 66 of the stuffing box 11 adjacent to the outer periphery 50 of the interface 38, 42 of the sealing rings 37, 40.

Referring in particular to FIGS. 2, 3, and 4, the construction of the carbon stationary sealing ring 40 is shown. On the sealing face 42 is a reservoir or groove means 43 consisting of three eccentric circular grooves 43a, 43b, and 43c, so disposed on the surface 42 with their three centers equidistantly and equiangularly spaced from the center of the rotary ring 37 that they provide three opposed pairs or six equally spaced intersections 43ab, 43ac, 43bc. Between these six intersections are six equally spaced triarcuate segment surfaces or lands 42a, each bounded by an arcuate portion of the three eccentric circular grooves 43a, 43b, 43c. The reservoir 43 is disposed in the annular surface 42 between the outer and inner peripheries 50 and 51 of the interface, so that there is provided a generally annular inner surface or land 42b and a generally annular outer surface or land 42c. Thus it is seen that both the lapped surfaces 42a, 42b, 42c and the reservoir 43 are substantially uniformly distributed over the annular surface 42. As best seen in FIG. 4, the grooves 43a, 43b, 43c are preferably V-shaped, as shown, with their sides 44 forming an acute angle 46 with the surface 42 at the groove edges. The base 45 of the grooves is preferably rounded, as shown, but may be varied in width to vary the angles 46. Empirical pumping tests with water in the stuffing box 11 at 300° F. and 300 p.s.i. have resulted in good cooling and lubrication of a 2 inch size mechanical seal when the ratio of areas of grooves 43 to seal face 42 is about 20 percent or 1 to 5, and in a 6 inch seal, about 34 percent or 1 to 3.

In operation of the mechanical seal of the invention as above described, the stuffing box cavity 11 contains liquid under pressure, either the liquid in communication with it through the opening 13 from the pump impeller cavity (not shown) or that brought into the stuffing box cavity portion 66 through the passage 65 by way of the inlet 63 and radial bore 64. Thus, the outer periphery 50 of the mechanical seal is exposed to pressure from the liquid in the cavity portion 66, and its inner periphery 51 is exposed to a lower or atmospheric pressure in the annular drainage chamber 32. This provides a pressure gradient and a tendency for a thin film of liquid from the cavity 66 to flow across the seal interface 38, 42 to the chamber 32 between the faces 38 and 42 of the sealing rings 37 and 40, respectively, providing a lubricating and cooling effect therebetween for the rings 37 and 40. Thus there is a hydrostatic effect tending to maintain a film of coolant and lubricant across the interface 38, 42. When operating at very high speeds and temperatures, the thin film may be inadequate or evaporate too fast. To overcome this, the sealing ring 40 is provided on its sealing surface 42 with the reservoir or groove means 43 so that cooling and lubricating liquid is retained therein for adequate cooling and lubrication when operating at high speeds and temperatures.

As pointed out above, the reservoir 43 consists of a plurality (three in the illustrated embodiment) of V-shape eccentric circular grooves 43a, 43b, 43c, connected at their three pairs or six intersections 43ab, 43ac, 43bc to form a continuous reservoir cavity 43. Since the grooves are eccentric to each other and to the rotary shaft 14, any arc or portion of any of the grooves 43a, 43b, 43c is oblique to the path of rotation of the relative circumferential travel at the interface 38, 42, and to the fluid flow path from outer to inner periphery at the interface; thus the grooves 43, during the relative rotation, provide a hydrodynamic effect across the annular interface 38, 42 so as to spread over the annular seal interface the cooling and lubricating effect of the liquid in the reservoir 43. A substantially continuous and uniformly distributed film is thereby assured between the contacting faces 38 and 42 from the cavity portion 66 and the reservoir 43; and the reservoir 43 is maintained constantly replenished and filled by the flow of the film of liquid across the interface because of the pressure gradient across the interface 38, 42 from its outer periphery 50 to its inner periphery 51. There is thus provided at the sealing interface 38, 42 enhanced cooling and lubricating by a combination of hydrostatic and hydrodynamic forces tending to maintain a film of fluid between the seal faces 38 and 42.

While one form of mechanical seal with a stationary sealing ring having three eccentric grooves on its surface providing a reservoir for liquid has been shown and described, it should be considered as merely exemplary of the invention, as more or fewer grooves might be used, nor would the groove portions necessarily have to be connected. To illustrate, if groove 43c, for example, were eliminated, there would be two eccentric grooves 43a, 43b, with two intersections 43ab, 43ab spaced 180° apart, providing therebetween two diarcuate sealing surfaces or lands and with inner and outer generally annular sealing surfaces or lands; and if two of the grooves were eliminated, leaving only one eccentric groove, its arcuate portions would be oblique to the path of rotation and there would be generally annular lands at either side of the groove. Also, to provide the hydrodynamic effect by the reservoir of liquid across the interface, a radial groove, a circularly sinuous groove, a polygonal groove, or other shapes, either continuous or discontinuous, symmetrical or asymmetrical, providing portions oblique to the path rotation of the rotary ring would be effective. Further, the reservoir could be in the rotary face, rather than in the stationary face as shown, or in both of them; and the pressure gradient might be reversed, the high-pressure side being at the inner periphery of the interface and the low-pressure side at the outer periphery. Thus, various changes and modifications may be made in the preferred embodiment without departing from the invention as defined in the claims.

I claim:

1. A mechanical seal for sealing a rotatable shaft to a wall that separates fluids under different pressures, said wall having an aperture through which the shaft extends, said seal comprising:
   a. a stationary sealing ring sealingly mounted on the wall and encircling the shaft, and having a generally radial annular sealing surface;
   b. a rotary sealing ring sealingly mounted on and encircling the shaft, and having a generally radial annular sealing surface;
   c. said sealing rings being disposed to mate said annular sealing surfaces for relative rotation therebetween and to provide an annular sealing interface therebetween, said interface having a radially outer periphery exposed to the fluid on one side of the wall and a radially inner periphery exposed to the fluid on the other side of the wall;

d. one of said rings being movable axially with respect to the other of said rings;

e. resilient means for restraining said one ring against said axial movement; F. ONE OF SAID RINGS HAVING GROOVE MEANS OPENING INTO SAID ANNULAR SEALING INTERFACE, SAID GROOVE MEANS SPACED INWARD FROM SAID OUTER PERIPHERY AND OUTWARD FROM SAID INNER PERIPHERY: AND g. said groove means including a plurality of generally circular grooves extending substantially completely about said annular sealing interface in eccentric and intersecting relation with one another.

2. A mechanical seal as defined in claim 1 wherein said groove means is disposed in said stationary sealing ring.

3. A mechanical seal as defined in claim 1 wherein the area of said groove means is substantially less than the area of the sealing surface of said one of said rings.

4. A mechanical seal as defined in claim 3 wherein the ratio of the area of said groove means to the area of the sealing surface of said one of said rings is substantially from one-fifth to one-third.

5. A mechanical seal as defined in claim 1 wherein said plurality of grooves comprises three circular grooves of equal radius, the centers of the three circles being spaced equidistantly and equiangularly about the center of said rotary sealing ring so that the intersections of said circular grooves are equally spaced circumferentially about said annular interface.

6. A mechanical seal as defined in claim 1 wherein said grooves and the intersections of said grooves define a plurality of sealing surface lands bounded by said grooves.

7. A mechanical seal as defined in claim 1 wherein said grooves are V-shaped with rounded bottoms.

8. A mechanical seal as defined in claim 1 wherein said sealing rings and said grooves define a reservoir adapted to retain cooling and lubricating fluid.

9. A mechanical seal as defined in claim 8 wherein said grooves are adapted to distribute fluid from said reservoir to between said sealing surfaces upon relative rotation therebetween.

* * * * *

Disclaimer 3,638,957.—*Joseph A. Marsi*, Baldwin Park, Calif. MECHANICAL SEAL WITH LUBRICATING MEANS. Patent dated Feb. 1, 1972. Disclaimer filed Oct. 10, 1972, by the assignee, *Borg-Warner Corporation*.
Hereby enters this disclaimer to claims 1 to 9 of said patent.
[*Official Gazette December 26, 1972.*]